(12) United States Patent
Fang et al.

(10) Patent No.: US 7,907,506 B2
(45) Date of Patent: Mar. 15, 2011

(54) METHOD, SYSTEM AND DEVICE FOR XDSL CROSSTALK CANCELLATION

(75) Inventors: Liming Fang, Shenzhen (CN); Ying Li, Shenzhen (CN); Zihuan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 12/369,443

(22) Filed: Feb. 11, 2009

(65) Prior Publication Data

US 2009/0147666 A1 Jun. 11, 2009

Related U.S. Application Data

(63) Continuation of application No. PCT/CN2007/070559, filed on Aug. 27, 2007.

(30) Foreign Application Priority Data

Aug. 28, 2006 (CN) .......................... 2006 1 0062347
Mar. 29, 2007 (CN) .......................... 2007 1 0096279

(51) Int. Cl.
H04J 1/12 (2006.01)
(52) U.S. Cl. ..................... 370/201; 370/252; 379/417
(58) Field of Classification Search .............. 370/201, 370/278, 282–291; 379/417; 381/13, 47, 381/71.1, 83, 93, 94.1; 455/24, 63.1–65, 455/135, 222–224, 278.1, 283–288, 296–312, 455/501–506
See application file for complete search history.

(56) References Cited

U.S. PATENT DOCUMENTS

| | | | |
|---|---|---|---|
| 6,272,113 B1 * | 8/2001 | McIntyre et al. | 370/248 |
| 6,449,261 B1 | 9/2002 | Humphrey | |
| 6,760,847 B1 | 7/2004 | Liu et al. | |
| 6,973,170 B2 | 12/2005 | Starr | |
| 6,990,196 B2 * | 1/2006 | Zeng et al. | 379/417 |
| 6,999,504 B1 * | 2/2006 | Amrany et al. | 375/222 |
| 7,593,458 B2 * | 9/2009 | Cioffi | 375/222 |
| 7,640,000 B2 * | 12/2009 | Cheong et al. | 455/295 |
| 2004/0086064 A1 * | 5/2004 | Van Acker et al. | 375/346 |
| 2004/0146002 A1 * | 7/2004 | Azadet | 370/201 |
| 2004/0151190 A1 | 8/2004 | Kelliher et al. | |

(Continued)

FOREIGN PATENT DOCUMENTS

CA 2 237 118 A1 5/2002

(Continued)

OTHER PUBLICATIONS

Tsiaflakis, P.; Vangorp, J.; Moonen, M.; Verlinden, J.; Ysebaert, G.; This paper appears in: Communications, 2006. ICC '06. IEEE International Conference on Issue Date: Jun. 2006 on pp. 3264-3269; Partial crosstalk cancellation in a multi-user xDSL environment.*

(Continued)

Primary Examiner — Ricky Ngo
Assistant Examiner — Gary Mui
(74) Attorney, Agent, or Firm — Brinks Hofer Gilson & Lione (57) ABSTRACT

A method and system for xDSL crosstalk cancellation is provided. The method includes dividing xDSL signals into a plurality of signal sets; and connecting signals from a same signal set to a same processing unit to be processed. A digital subscriber line access multiplexer (DSLAM) includes a line switching control module and at least one processing unit.

20 Claims, 7 Drawing Sheets

U.S. PATENT DOCUMENTS

| | | | |
|---|---|---|---|
| 2005/0249297 A1 | 11/2005 | Kratochwil | |
| 2006/0039456 A1 | 2/2006 | Bostoen et al. | |
| 2007/0025253 A1* | 2/2007 | Enstone et al. | 370/235 |
| 2007/0133787 A1* | 6/2007 | Verlinden et al. | 379/417 |
| 2008/0288620 A1* | 11/2008 | Goff et al. | 709/223 |

FOREIGN PATENT DOCUMENTS

| | | |
|---|---|---|
| CN | 1722714 A | 1/2006 |
| CN | 1741406 A | 3/2006 |
| CN | 1816029 A | 8/2006 |
| WO | 02/058315 A1 | 7/2002 |

OTHER PUBLICATIONS

Zeng et al. Crosstalk Cancelation in xDSL System; Mar. 30, 2001.*

International Search Report Issued in corresponding PCT Application No. PCT/CN2007/070559; Dec. 13, 2007.

Cendrillon, Raphael et al. "Partial Crosstalk Cancellation for Upstream VDSL." EURASIP Journal of Applied Signal Processing. (Aug. 15, 2004): 1520-1535.

Cendrillon, R. et al. Low Complexity Crosstalk Cancellation Through Line Selection in Upstream VDSL. Proceedings of International Conference on Acoustics, Speech and Signal Processing. (Apr. 6, 2003).

Written Opinion of the International Searching Authority issued in corresponding PCT Application No. PCT/CN2007/070559; mailed Dec. 13, 2007.

Supplementary European Search Report issued in corresponding European Patent Application No. 07 78 5456; issued Dec. 23, 2009.

Office Action issued in corresponding Chinese Patent Application No. 2007100962798; issued Feb. 5, 2010.

Second Chinese Office Action issued in corresponding Chinese Patent Application No. 20071096279.8, mailed Sep. 27, 2010.

* cited by examiner

METHOD, SYSTEM AND DEVICE FOR XDSL CROSSTALK CANCELLATION

CROSS-REFERENCE TO RELATED APPLICATIONS

The application is a continuation application of PCT application No. PCT/CN2007/070559, field on Aug. 27, 2007, entitled "Method, System and Device for xDSL Crosstalk Cancellation", which claims the benefit of priority to China Patent Application No. 200610062347.4, entitled "Method and System for Crosstalk Cancellation of Multi-pair xDSL", filed on Aug. 28, 2006, and China Patent Application No. 200710096279.8, entitled "Method, System and Device for Crosstalk Cancellation of Multi-pair xDSL", filed on Mar. 29, 2007, all of which are all incorporated herein by reference in their entireties.

BACKGROUND

1. Field of the Disclosure

The present invention relates to the field of digital subscriber line (DSL) technology, and more particularly to a method, system, and device for crosstalk cancellation of multi-pair xDSL.

2. Discussion of the Related Art

Figure 1:
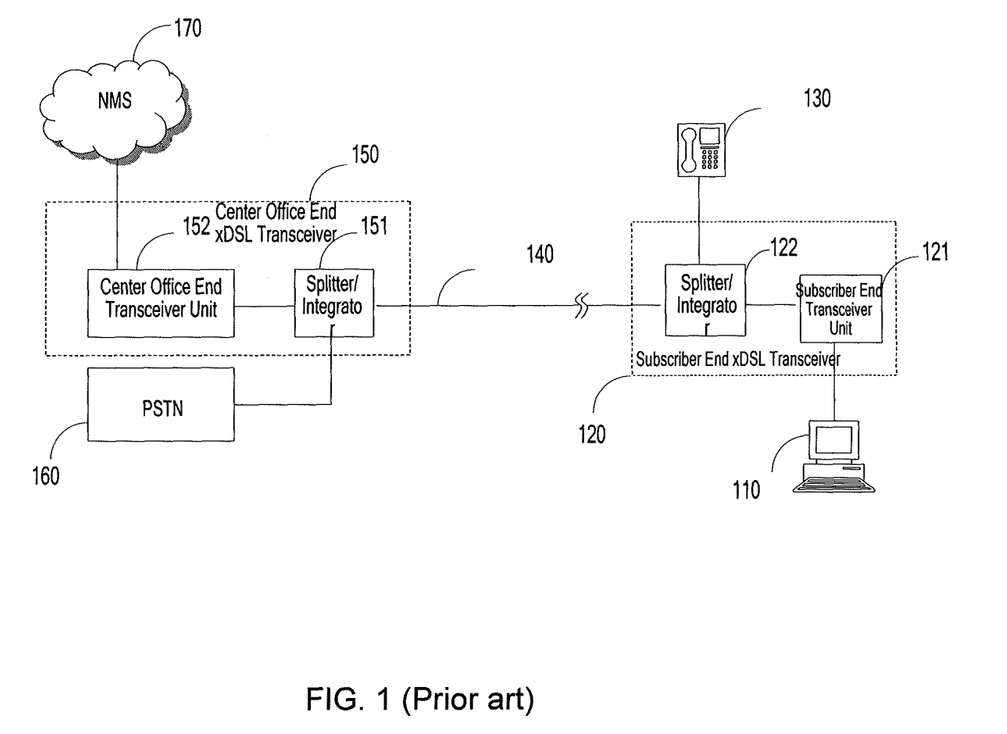
FIG. 1 shows a reference model of an xDSL system in the prior art.

A pass-band transmission xDSL adopts discrete multi-tone modulation (DMT) technology for modulation and demodulation. A system for providing multiple DSL access is referred to as a digital subscriber line access multiplexer (DSLAM), a connection relation of which is shown in FIG. 1. The subscriber end xDSL transceiver 120 includes a subscriber end transceiver unit 121 and a splitter/integrator 122. In an uplink direction, the subscriber end transceiver unit 121 receives and amplifies a DSL signal from a computer 110, and sends the amplified DSL signal to the splitter/integrator 122. The splitter/integrator 122 integrates the DSL signal from the subscriber end transceiver unit 121 with a plain old telephone service (POTS) signal from a telephone terminal 130. The integrated signal is transmitted through multiple unshielded twisted pairs (UTPs) 140 and received by a splitter/integrator 151 in a center office end xDSL transceiver 150. The splitter/integrator 151 splits the received signal, sends the POTS signal to a public switched telephone network (PSTN) 160 and sends the DSL signal to a center office end transceiver unit 152 of the center office end xDSL transceiver 150. The center office end transceiver unit 152 re-amplifies the received xDSL signal and then sends it to a network management system (NMS) 170. In a downlink direction, signal is transmitted in a sequence reverse to the above processes.

Figure 2:
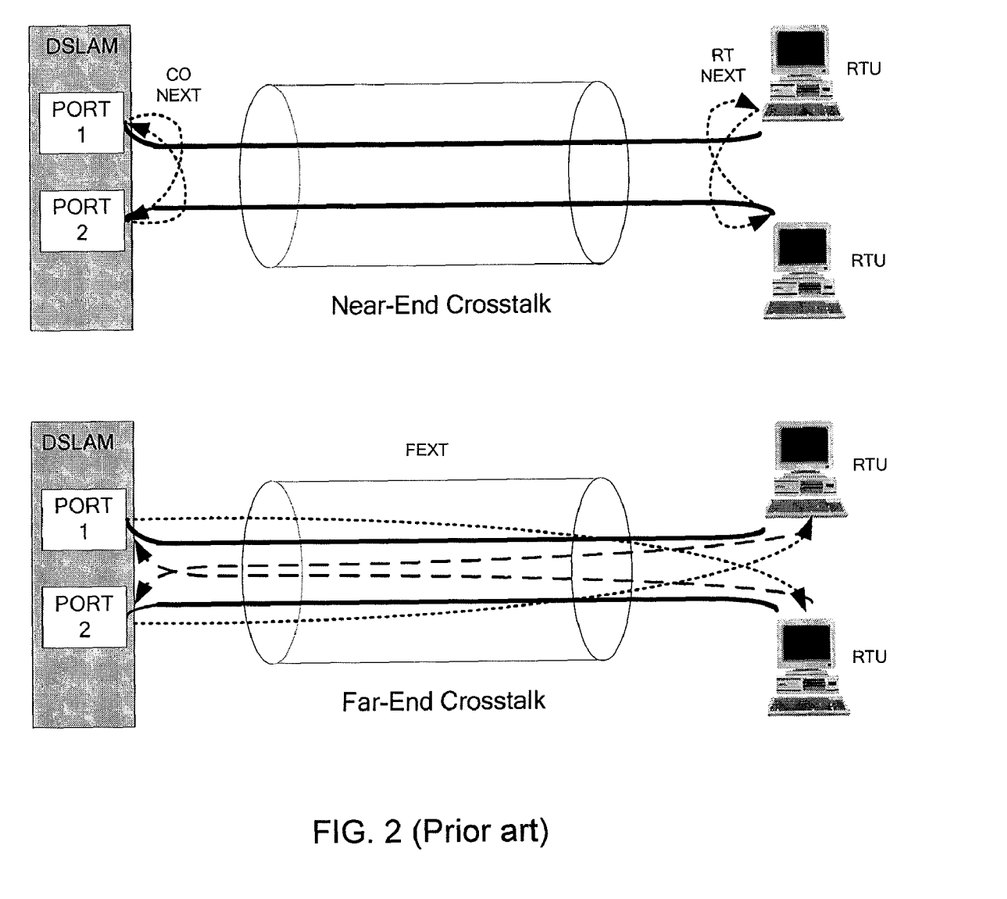
FIG. 2 is a schematic view of a crosstalk in the xDSL system in the prior art.

As a frequency band adopted in the xDSL technology is continuously increased, the crosstalk becomes increasingly severe, especially in high frequency bands. Referring to FIG. 2, because uplink and downlink channels of the xDSL adopt frequency division multiplexing technology, a near-end crosstalk (NEXT) does not cause significant influences to the system performance; however, a far-end crosstalk (FEXT) brings severe impacts on the transmission performance of the lines. When xDSL services are activated in a bundle of cables upon being requested by a plurality of subscribers, certain lines may suffer from a low transmission rate and an instability problem; even the xDSL services may not be activated due to FEXT, which results in a low line activation rate of the DSLAM. For example, according to current technical standards for xDSL, theoretically, VDSL2 (vectored-DSL) can provide an uplink-downlink symmetrical rate of up to 100 Mbps. However, an obvious problem may occur during the actual deployment due to FEXT and high frequency signal attenuation.

Currently, a vectored-DSL technology has been proposed in the industry, which mainly uses the DSLAM terminals to perform joint transmitting and receiving, so as to cancel the interference of FEXT by means of signal processing, thereby eventually enabling each signal to be free of FEXT interference.

Figure 3:
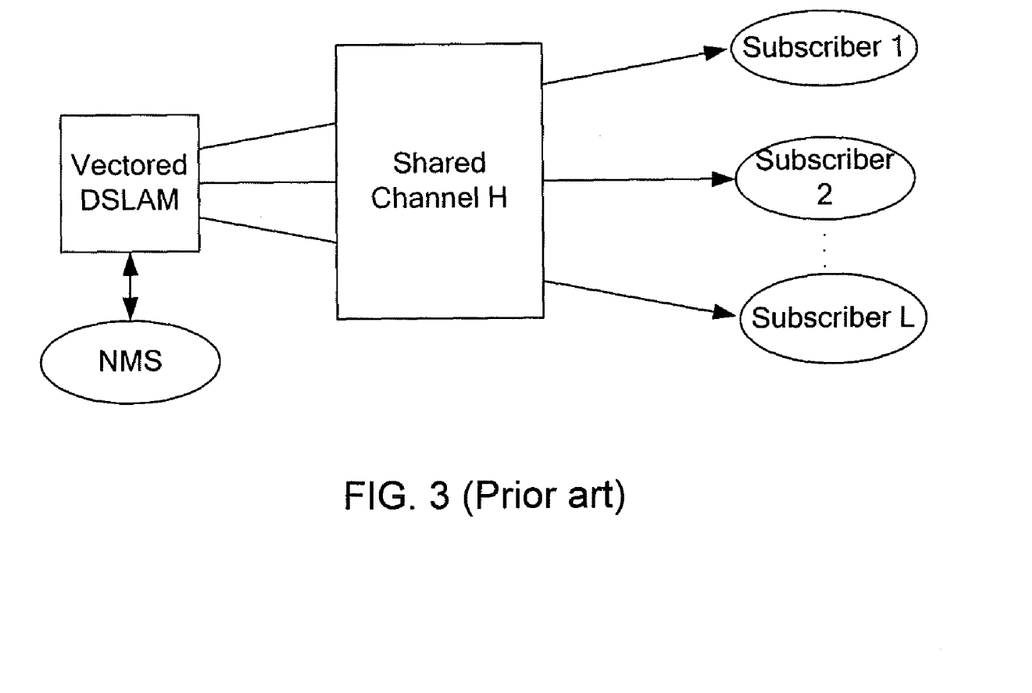
FIG. 3 is a schematic view of a situation where a DSLAM terminal jointly transmit and subscriber ends respectively receive vectors in an existing vectored-DSL technology.

FIG. 3 shows a situation where a center office end jointly sends and subscriber ends respectively receive downlink vectors. The process of receiving downlink vectors is described as follows.

1. A matrix $H^T$ is expressed as $H^T=Q_i \cdot R_i$ according to QR decomposition. Herein, R is an upper triangular matrix; $Q^*$ is a unitary matrix, i.e., $QQ^*=Q^*Q=1$, in which the superscript * represents a conjugate transpose; $H^T$ is a transpose matrix of H. Accordingly, $H=R^T Q^T$.

2. It is assumed that $x_i = Q_i^{T*} x_i'$, and $x_i' = R_i^{-T} \text{diag}(R_i^T) \tilde{x}_i$, in which diag represents a diagonalizable matrix.

If $y_i = H_i x_i + N_i = R_i^T Q_i^T Q_i^{T*} R_i^{-T} \text{diag}(R_i^T) \tilde{x}_i + N_i = \text{diag}(R_i^T) \tilde{x}_i + N_i$, as for a noiseless channel, an output is turned to be $\hat{y} = \text{diag}(R_i^T) \tilde{x}_i$, which is a diagonal matrix, thereby canceling the crosstalk.

Figure 4:
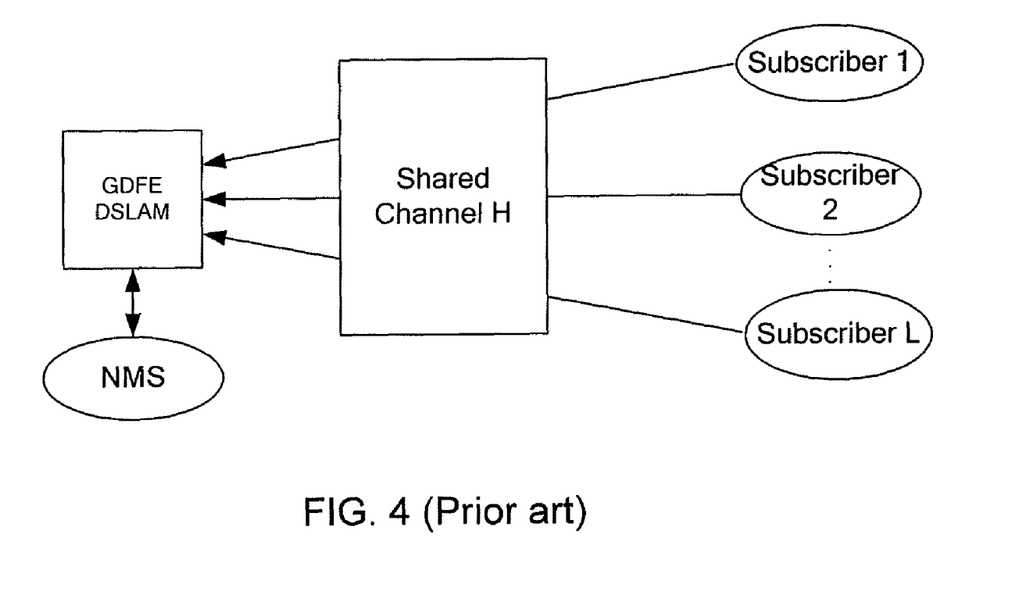
FIG. 4 is a schematic view of a situation where subscriber ends respectively transmit and the DSLAM terminal jointly receives vectors in the existing vectored-DSL technology.

FIG. 4 shows a situation where the subscriber ends respectively send and the center office end jointly receives uplink vectors. The process of receiving uplink vectors is described as follows.

1. The matrix H is expressed as $H_i = Q_i \cdot R_i$ according to QR decomposition. Herein, R is an upper triangular matrix; Q is a unitary matrix, i.e., $QQ^*=Q^*Q=1$, in which the superscript * represents a conjugate transpose.

2. An uplink receiving end is:

$$Y_i = H_i x_i + N_i \tag{1}$$

Both sides of Equation (1) are multiplied by $Q^*$, so as to obtain the following equation:

$$\hat{Y}_i = Q^*(H_i x_i + N_i) \tag{2}$$

Accordingly, $$\hat{Y}_i = Q^* \cdot Q \cdot R_i x_i + Q^* \cdot N_i = R_i x_i + Q^* \cdot N \tag{3}$$

As seen from Equation (3), as for a noiseless channel, an output is $\hat{Y}_i = R_i x_i, 1 \leq i \leq L$, which is an upper triangular matrix.

3. An output value is estimated through using generalized decision feedback equalization (GDFE).

It can be seen that, the $L^{th}$ output is a value without crosstalk and can be estimated by using a simple decoder, so as to obtain the $L^{th}$ output value. By means of subtracting the $L^{th}$ estimated result from the $(L-1)^{th}$ output, the crosstalk of the $(L-1)^{th}$ tone caused by the $L^{th}$ tone is cancelled. Through simple estimation, the $(L-1)^{th}$ output value can be obtained, and so forth. Therefore, the first output value is obtained by subtracting the previously estimated value, and the ISI (Inter Symbol Interference) is thus cancelled.

The shared channel H in FIGS. 3 and 4 may be expressed as a matrix:

$H(f) = [H_{km}(f)]_{k=1...L, m=1...L}$, in which $H_{km}(f)$ is a propagation equation from a pair m to a pair k. In practice, k is equal to m and both pairs are equal to the number of channels involved in a crosstalk effect on each other in the shared channel, which is set as L herein. Thus, H is a L×L channel transmission matrix. A processor processes the L×L channel transmission matrix, so as to cancel the interference of FEXT.

A typical DSL bundle generally consists of 50 to 100 twisted pairs. If it intends to cancel all of the crosstalk, the processor generally needs to process a H matrix of 50×50 or 100×100, which exceeds the current computation complexity constraints of digital signal processing at the centre office (CO) end.

SUMMARY

A method for xDSL crosstalk cancellation is provided, which includes the following steps: A plurality of xDSL signals is divided into two or more signal sets. Signals belonging to the same signal set are connected to the same processing unit in a digital subscriber line access multiplexer (DSLAM) to be processed. An xDSL system is also provided, which includes a line switching control module and a DSLAM. The line switching control module is adapted to divide a plurality of xDSL signals into two or more signal sets and connect signals belonging to the same signal set to a same processing unit in the DSLAM. The DSLAM includes at least one processing unit. Each of the processing units is respectively adapted to process signals belonging to the same signal set. A digital subscriber line access multiplexer (DSLAM) is also provided, which includes a line switching control module and a plurality of processing units. The line switching control module is adapted to divide a plurality of xDSL signals into two or more signal sets and transmit signals belonging to the same signal set to the same processing unit. Each of the processing units is adapted to process the signals belonging to a same signal set.

In the embodiments of the present invention, signals carried by all pairs in a bundle are divided into several signal sets, and signals in each signal set are processed by one processing unit, so that numbers of rows and columns in a channel transmission matrix processed by each processing unit are far less than those in the prior art. Through using the technical solutions of embodiments of the present invention, the computing operation of the transmission matrix on the processor is simplified, and the crosstalk cancellation is also achieved.

BRIEF DESCRIPTION OF THE DRAWINGS

The present invention is described in detail as follows by reference to the embodiments and drawings, among which.

DETAILED DESCRIPTION OF THE EMBODIMENTS

In the embodiments of the present invention, first, a plurality of signals carried by all pairs in a bundle are divided into several signal sets based upon the principles that the signal sets are mutually exclusive and the crosstalk generated between the signals in each divided signal set is rather significant. Then, signals belonging to the same signal set are connected by a line switching control module to the same processor in a digital subscriber line access multiplexer (DSLAM) to be processed. Numbers of rows and columns in a channel transmission matrix processed in each processor are far less than those in the prior art.

A method for crosstalk cancellation provided in an embodiment of the present invention includes the following steps.

1. Signals carried by all pairs in a bundle are divided into a plurality of signal sets.

In a DSL system, as for a particular subscriber, most crosstalk is only generated from few other subscribers in the system. Therefore, M signal sets may be selected from a bundle (assuming that a bundle consists of L signals) by a selection algorithm based on lines, tones, or combination of lines and tones, and are stored at a DSLAM end. The selected M signal sets meet the following requirements: Crosstalk between the signals in each signal set is rather significant, the signal sets are mutually exclusive, each signal set contains L/M signals, and M is exactly divisible by L. In addition, because channels performance slowly changes as time elapses and as the subscribers log in or log out, crosstalk between the subscribers changes dynamically. After the signals have been divided into the signal sets according to the above method, if the crosstalk between the subscribers changes, a channel monitoring system is used to monitor and collect crosstalk information, so as to obtain information about crosstalk variation between the subscribers and transmit the information to a line switching control module. The line switching control module re-divides the signals carried by the pairs in a bundle into a plurality of signal sets according to the information about crosstalk variation. The information about crosstalk variation includes crosstalk variation information caused by the subscribers logging in or log out and/or by the channels performance slowly changing as time elapses.

The signals in a bundle may be divided into a plurality of signal sets by a variety of algorithms such as a greedy algorithm. The signals are divided in such a way that the divided signal sets are mutually exclusive, and crosstalk between the signals in each signal set is rather significant.

2. Signals belonging to the same signal set are connected, by the line switching control module, to the same processor in the DSLAM for a computing operation. The number of rows and the number of columns in a channel transmission matrix processed in each processor are all L/M.

Figure 5:
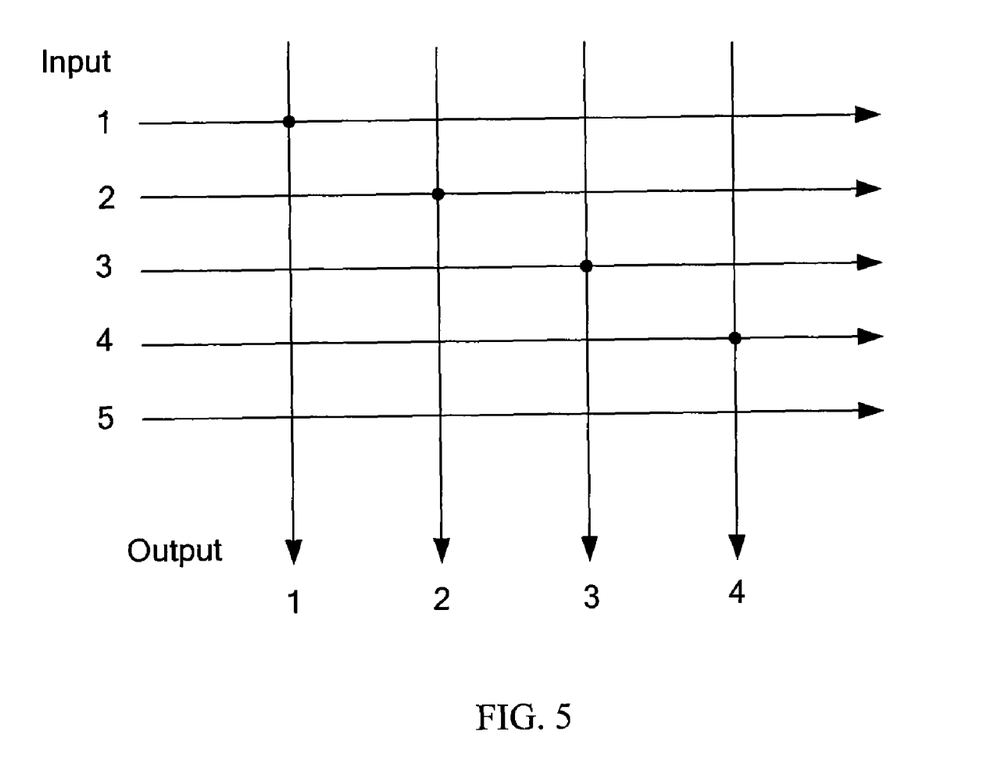
FIG. 5 is a schematic view of a switching matrix in an embodiment of the present invention.

In an embodiment of the present invention, the line switching control module may be a switching matrix. The switching matrix generally refers to a matrix that has a plurality of output options in the case of a plurality of inputs, so as to form a matrix structure as shown in FIG. 5. In other words, each output can be connected to different input signals through switching.

A system in an embodiment of the present invention includes a DSLAM and a switching matrix.

The switching matrix is adapted to divide a plurality of xDSL signals into two or more signal sets and transmit signals belonging to the same signal set to the same processor in the DSLAM to be processed.

The DSLAM includes two or more processors. Each processor is adapted to process signals belonging to the same signal set.

Detailed descriptions are given below with reference to the accompanying drawings.

In the embodiments of the present invention, it is assumed that a bundle consists of 24 pairs of lines for transmitting 24 signals, the 24 signals are divided into 6 signal sets, each signal set contains 4 signals, the signal sets are mutually exclusive, and crosstalk between the signals in each signal set is rather significant.

Embodiment 1

The Switching Matrix Adopts a Relay Matrix

The 24 signals are divided into 6 signal sets by a greedy algorithm. If crosstalk between a subscriber 1 (pair 1), and a subscriber 2 (pair 2), a subscriber 7 (pair 7), as well as a subscriber 8 (pair 8) is rather significant, the subscriber 1, the subscriber 2, the subscriber 7, and the subscriber 8 constitute a signal set. Similarly, a subscriber 3, a subscriber 4, a subscriber 5, and a subscriber 15 constitute another signal set. Correspondingly, the other 16 signals of the 24 signals are divided into the other 4 signal sets.

Figure 6:
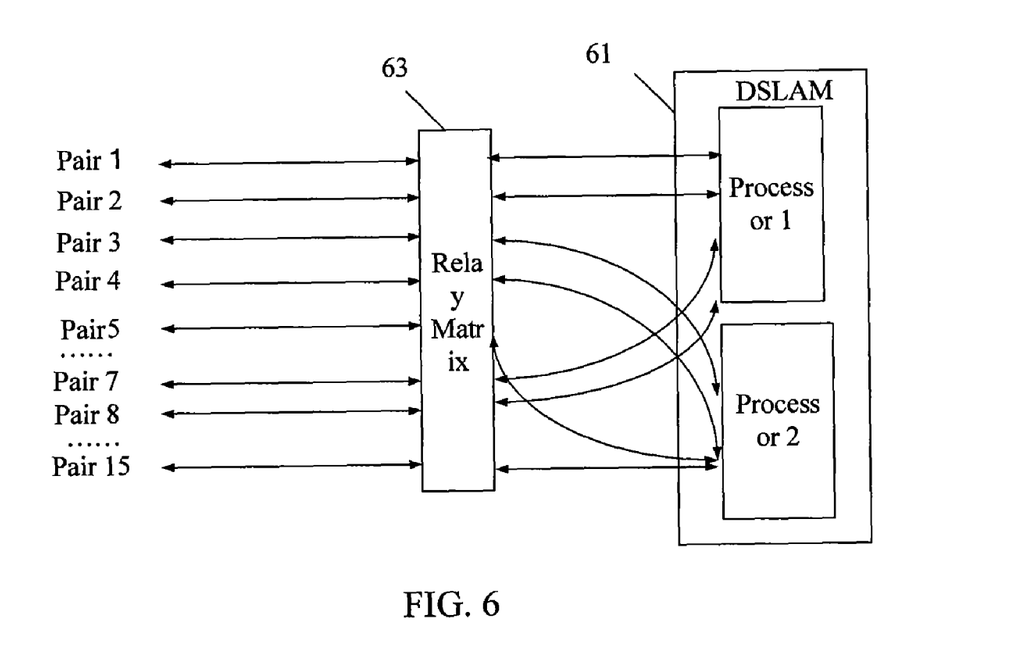
FIG. 6 shows principles of implementing line switching by using a relay matrix in an embodiment of the present invention.
Figure 7:
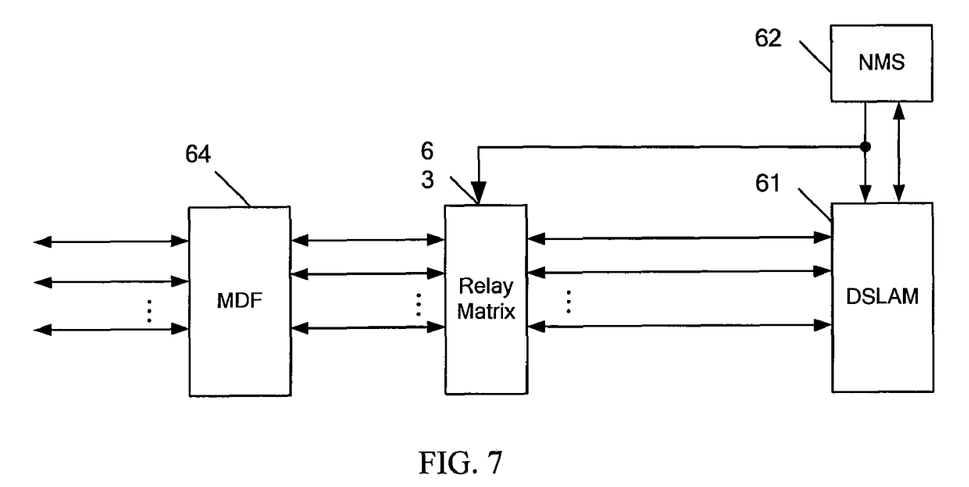
FIG. 7 is a schematic view of connection relations between the relay matrix and a DSLAM as well as an MDF in an embodiment of the present invention.

Referring to FIGS. 6 and 7, a DSLAM 61 sends a control signal through a network management system (NMS) 62. Upon receiving the control signal, a relay matrix 63 switches a selection switch thereof. Signals from the pair 1, the pair 2, the pair 7, and the pair 8 of a main distribution frame (MDF) 64 are A/D converted and then computed by a processor (processor 1). Similarly, the pair 3, the pair 4, the pair 5, and the pair 15 are connected to another processor (processor 2) for computation processing. Other signals belonging to the same signal set are connected to another processor (not shown in FIG. 6) to be processed. The number of rows and the number of columns for a channel transmission matrix processed in each processor are both 4. To the contrary, downlink signals are processed and D/A converted, and then pass through the relay matrix 63, so as to be connected to the MDF 64.

In this embodiment, the relay matrix is disposed separately from the DSLAM. Alternatively, it may also be disposed within the DSLAM in specific applications.

Embodiment 2

The Switching Matrix Adopts a Digital Matrix

An algorithm for dividing xDSL signals into two or more signal sets is the same as that in Embodiment 1.

Figure 8:
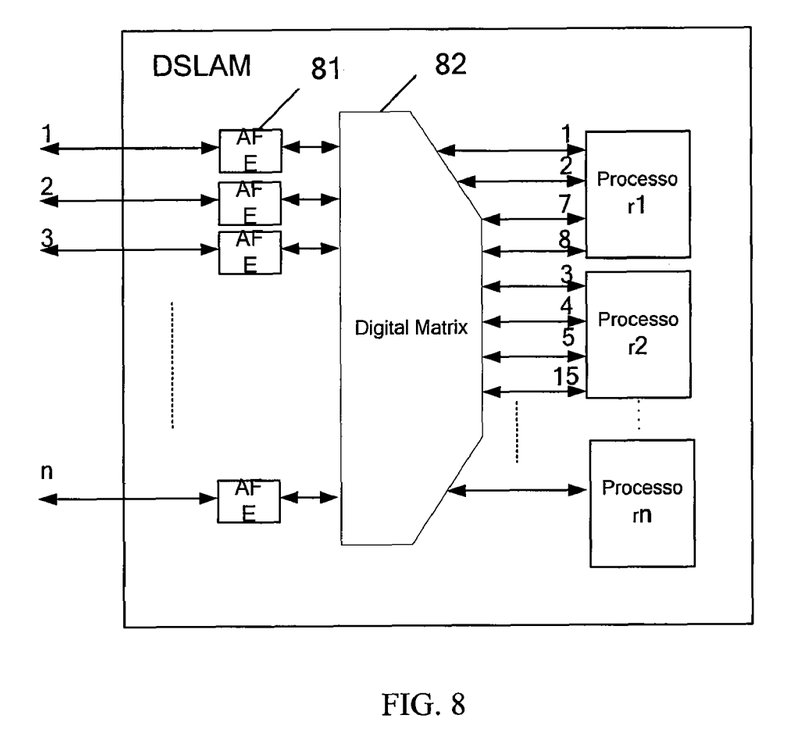
FIG. 8 shows principles of implementing line switching by using a digital matrix in an embodiment of the present invention.
Figure 9:
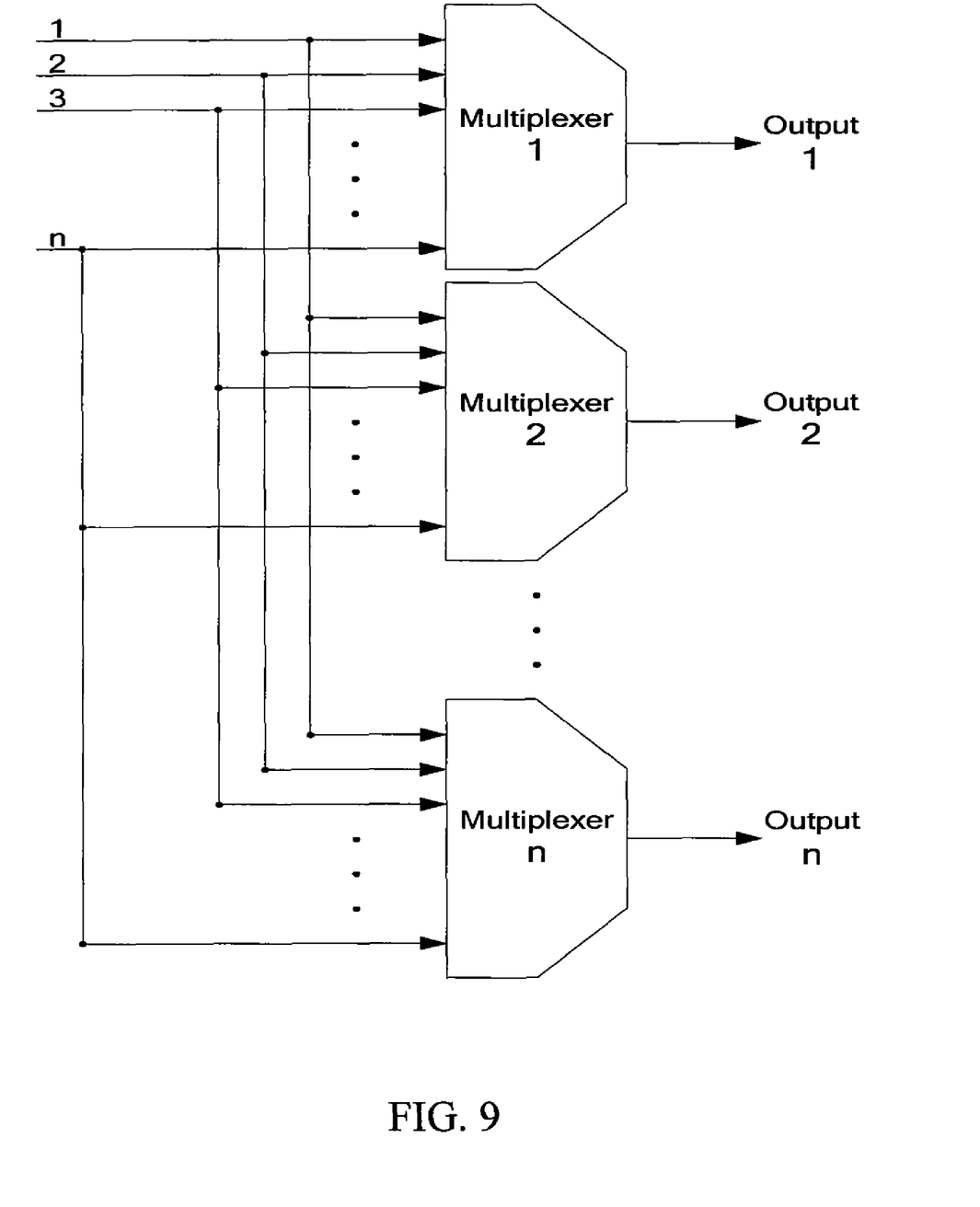
FIG. 9 is a schematic view of implementing line switching by a digital matrix through using a multiplexer in an embodiment of the present invention.

In this embodiment, a digital matrix is used to select the signals. The digital matrix has a larger capacity and a better maintainability than the analog matrix (e.g. relay matrix). At the DSLAM end, signals belonging to the same signal set are connected to the same processor for operational processing through the digital matrix. FIG. 8 shows principles of implementing line switching by using a digital matrix. Subscriber line signals 1, 2, 3, ... n from an MDF (not shown in FIG. 8) are A/D converted by an analog front end (AFE) 81 and connected to a digital matrix 82. The digital matrix 82 selects the signals by a multiplexer as shown in FIG. 9, and connects the selected signals that belong to the same signal set to the same processor for operational processing. Referring to FIG. 8, signals carried by a pair 1, a pair 2, a pair 7, and a pair 8 are connected to one processor (processor 1) for operational processing. Signals carried by a pair 3, a pair 4, a pair 5, and a pair 15 are connected to another processor (processor 2) for operational processing. Other signals belonging to the same signal set are connected to a same processor for operational processing. The number of rows and the number of columns for a channel transmission matrix processed in each processor are 4. To the contrary, after the operational processing by the processors, downlink signals pass through the digital matrix 82, are D/A converted in the AFE and then output to the MDF (not shown).

In this embodiment, the digital matrix is disposed within the DSLAM. Alternatively, it may also be disposed separately from the DSLAM in specific applications.

Embodiment 3

The Switching Matrix Adopts a Digital Matrix and a Relay Matrix

Figure 10:
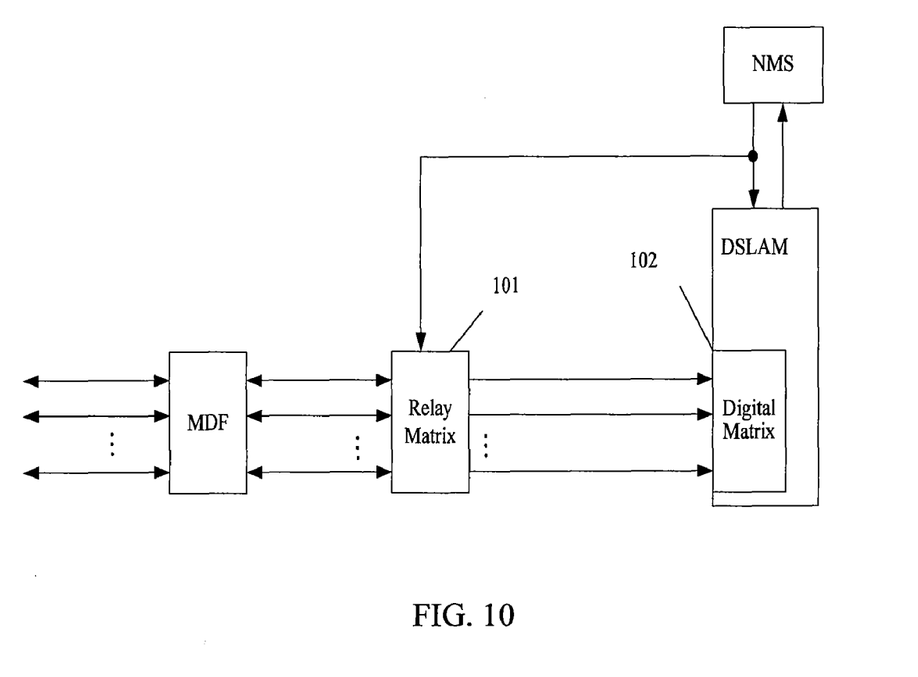
FIG. 10 is a schematic view of implementing line switching by using a relay matrix and a digital matrix simultaneously in an embodiment of the present invention.

Referring to FIG. 10, the system in this embodiment of the present invention may also adopt both a digital matrix 101 and a relay matrix 102 to implement signal switching. Through using both the digital matrix and the relay matrix, the transmission matrix on the processor is simplified into two transmission matrixes. For example, a single transmission matrix of 100×100 may be made into 5 matrixes of 100×20 and 5 matrixes of 20×20, so as to simplify this large matrix.

The switching matrix (relay matrix or digital matrix) in the above embodiments may be configured as an independent entity, and may also be integrated into the MDF.

Embodiment 4

Figure 11:
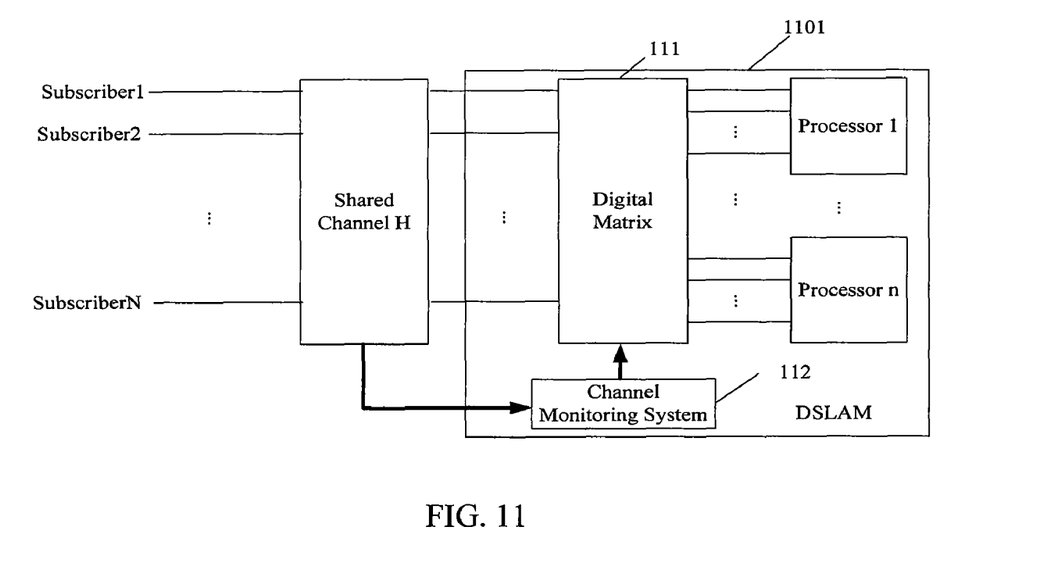
FIG. 11 is a structural view of a system in an embodiment of the present invention.

Dynamically Adjust the Signal Sets When Crosstalk between the Subscribers Changes FIG. 11 shows a system structure of this embodiment. A line switching control module adopts a digital matrix 111 and is disposed within a DSLAM 1101.

The digital matrix 111 divides a plurality of xDSL signals into two or more signal sets according to updated crosstalk information and transmits signals belonging to the same signal set to the same processor in the DSLAM 1101 to be processed.

The process of dividing the signals into a plurality of signals sets may be implemented by a variety of algorithms such as a greedy algorithm. The signals are divided in such a way that the divided signal sets are mutually exclusive, and crosstalk between the signals in each signal set is rather significant. The DSLAM 1101 further includes a channel monitoring system 112. The channel monitoring system 112 is adapted to monitor crosstalk information between the subscribers through a shared channel H and transmit information about crosstalk variation between the subscribers to the digital matrix 111. The information about crosstalk variation includes crosstalk variation information caused by the subscribers going online or offline and/or the channels performance slowly changing as time elapses.

In particular, the channel monitoring system 112 monitors the online and offline states of the subscribers. The channel monitoring system 112 tracks and processes the channels (for example, by sending an "abuse" signal) and obtains crosstalk information between the subscribers in real time according to the online and offline states of the subscribers. When a subscriber goes online, changed crosstalk information is transferred to the digital matrix 111, and the digital matrix 111 divides signals in a bundle into a plurality of signal sets by a certain algorithm (for example, a greedy algorithm) according to the changed crosstalk information and outputs the signals belonging to the same signal set into the same processor to be processed. When a subscriber goes offline, changed crosstalk information is transferred to the digital matrix 111, and the digital matrix 111 divides signals in a bundle into a plurality of signal sets according to the changed crosstalk information and outputs the signals belonging to the same signal set into the same processor to be processed.

The line switching control module in the system of the above embodiments may also adopt a relay matrix configured independent from the DSLAM.

The processors in all the embodiments mentioned above may also be circuit modules that can jointly process signals from a certain number of lines and can achieve crosstalk cancellation. The circuit modules may also be referred to as processing units.

In addition, the line switching control module can also adjust the division of signal sets in real time according to the condition of crosstalk variation, thereby achieving a better crosstalk cancellation effect.

The above descriptions are merely for the exemplary embodiments of the present invention, which are not intended to limit the scope of present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for xDSL crosstalk cancellation, comprising:
    dividing a plurality of xDSL signals into a plurality of signal sets, wherein a first degree of crosstalk generated between signals from a same signal set is greater than a second degree of crosstalk generated between signals from different signal sets;
    connecting signals belonging to the same signal set to a same processing unit to be processed for crosstalk cancellation;
    monitoring crosstalk information among the plurality of xDSL signals, the crosstalk information comprising information about crosstalk variation; and
    re-dividing the plurality of xDSL signals into a plurality of signal sets according to the information about crosstalk variation.

2. The method according to claim 1, wherein the dividing a plurality of xDSL signals into a plurality of signal sets comprises:
    dividing the plurality of xDSL signals into the plurality of signal sets by a greedy algorithm.

3. The method according to claim 1, wherein any two signal sets of the plurality of signal sets are exclusive.

4. The method according to claim 3, wherein the connecting signals belonging to the same signal set to a same processing unit comprises:
    connecting the signals belonging to the same signal set to the same processing unit through an analog matrix.

5. The method according to claim 3, wherein the dividing a plurality of xDSL signals into a plurality of signal sets comprises:
    performing an analogue-to-digital (A/D) conversion on the plurality of xDSL signals; and
    dividing the converted plurality of xDSL signals into the plurality of signal sets;
    wherein the signals belonging to the same signal set are connected to the same processing unit through a digital matrix.

6. The method according to claim 3, wherein the connecting signals belonging to the same signal set to a same processing unit comprises:
    connecting the signals belonging to the same signal set to the same processing unit through a digital matrix and an analog matrix connected in series.

7. The method according to claim 1, wherein the information about crosstalk variation comprises crosstalk variation information caused by logging on or logging out of the subscriber, and/or, variation of channel performance as time elapses.

8. The method according to claim 7, wherein when a subscriber goes online or goes offline, information about crosstalk variation is obtained and the xDSL signals are re-divided and reconnected to the processing units for processing according to the information about crosstalk variation.

9. An xDSL system, comprising:
    a line switching control module adapted to divide a plurality of xDSL signals into a plurality of signal sets and connect signals belonging to a same signal set to a same processing unit in a digital subscriber line access multiplexer (DSLAM), a first degree of crosstalk generated between signals from the same signal set being greater than a second degree of crosstalk generated between signals from different signal sets; and
    the DSLAM, including a plurality of processing units, wherein each processing unit is respectively adapted to process the signals belonging to the same signal set;
    wherein the DSLAM further includes: a channel monitoring system, adapted to monitor crosstalk information comprising information about crosstalk variation among the plurality of xDSL signals and transfer the information about crosstalk variation to the line switching control module; and
    wherein the line switching control module is further adapted to re-divide the plurality of xDSL signals into a plurality of signal sets according to the received information about crosstalk variation and transmit the re-divided signals belonging to the same signal set to a same processing unit for processing.

10. The xDSL system according to claim 9, wherein the line switching control module is an analog matrix, and the xDSL system further comprises:
    a control unit adapted to control the analog matrix to connect the signals belonging to the same signal set to the same processing unit in the DSLAM.

11. The xDSL system according to claim 9, wherein the line switching control module is a digital matrix.

12. The xDSL system according to claim 11, wherein the DSLAM further comprising a plurality of analog front ends (AFEs) connected to the digital matrix, the analog front ends are configured to perform A/D conversion on the xDSL signals before the xDSL signals are provided to the digital matrix, and the digital matrix selectively connect the xDSL signals to the processing unit for processing the corresponding signal set to which the xDSL signals belong by means of multiplexers.

13. The xDSL system according to claim 11, wherein the analog matrix is configured as an independent entity connected to the DSLAM, and the digital matrix is integrated within the DSLAM.

14. The xDSL system according to claim 9, wherein the line switching control module is an analog matrix and a digital matrix connected in series.

15. The xDSL system according to claim 9, wherein the information about crosstalk variation comprises crosstalk variation information caused by logging on or logging out of a subscriber, and/or variation of channel performance as time elapses.

16. The xDSL system according to claim 9, wherein the line switching control module is disposed within the DSLAM.

17. The xDSL system according to claim 9, further comprising a network management system (NMS) and a main distribution frame (MDF), wherein the DSLAM sends a control signal through the NMS to the line switching control module, and upon receipt of the control signal, the line switching control module performs selection switching so as to connect the xDSL signals received from the MDF to a corresponding processing unit of the DSLAM.

18. A method for xDSL crosstalk cancellation, comprising:
dividing a plurality of xDSL signals carried by twisted pairs in a bundle into a plurality of signal sets, wherein the xDSL signals are divided such that crosstalk generated between xDSL signals from a same signal set is greater than that generated between xDSL signals from different signal sets in the bundle; and
connecting the xDSL signals belonging to a same signal set to a same processing unit to be processed for crosstalk cancellation;
wherein the xDSL signals are connected to the corresponding processing unit through a switch matrix comprising one of an analog matrix, a digital matrix, and a switch matrix comprising an analog matrix and a digital matrix connected in series.

19. The method according to claim 18, further comprising:
monitoring crosstalk information to obtain information about crosstalk variation between subscribers; and
re-dividing the xDSL signals carried by the twisted pairs in the bundle when the information about crosstalk variation between the subscribers is obtained.

20. The method according to claim 19, wherein the information about crosstalk variation comprises crosstalk variation information caused by logging on or logging out of the subscriber, and/or, variation of channel performance as time elapses.

* * * * *